United States Patent
Karaoguz et al.

(10) Patent No.: US 9,317,712 B2
(45) Date of Patent: Apr. 19, 2016

(54) PROVIDING SECURE COMMUNICATION AND/OR SHARING OF PERSONAL DATA VIA A BROADBAND GATEWAY

(75) Inventors: Jeyhan Karaoguz, Irvine, CA (US); Xuemin Chen, San Diego, CA (US); Wael Diab, San Francisco, CA (US); David Garrett, Tustin, CA (US); David Lundgren, Mill Valley, CA (US); Rich Prodan, Niwot, CA (US)

(73) Assignee: BROADCOM CORPORATION, Irvine, CA (US)

( * ) Notice: Subject to any disclaimer, the term of this patent is extended or adjusted under 35 U.S.C. 154(b) by 472 days.

(21) Appl. No.: 12/982,501

(22) Filed: Dec. 30, 2010

(65) Prior Publication Data

US 2011/0302634 A1 Dec. 8, 2011

Related U.S. Application Data

(60) Provisional application No. 61/351,696, filed on Jun. 4, 2010.

(51) Int. Cl.
*H04L 9/00* (2006.01)
*G06F 21/62* (2013.01)
(Continued)

(52) U.S. Cl.
CPC ............ *G06F 21/6245* (2013.01); *G05B 13/02* (2013.01); *G05F 1/66* (2013.01); *G06F 21/10* (2013.01); *G06Q 20/10* (2013.01); *G06Q 30/0215* (2013.01); *G06Q 30/0226* (2013.01); *G06Q 30/04* (2013.01); *G06Q 40/12* (2013.12); *H04L 12/1453* (2013.01); *H04L 12/2801* (2013.01); *H04L 12/66* (2013.01); *H04L 29/06095* (2013.01); *H04L 47/2491* (2013.01); *H04L 63/0281* (2013.01); *H04L 63/10* (2013.01); *H04L 63/205* (2013.01); *H04L 65/102* (2013.01); *H04L 65/40* (2013.01); *H04L 67/10* (2013.01); *H04L 67/1095* (2013.01); *H04L 67/12* (2013.01); *H04L 67/2842* (2013.01); *H04N 5/445* (2013.01); *H04N 21/482* (2013.01); *H04N 21/632* (2013.01); *H04W 12/08* (2013.01); *G06F 2221/07* (2013.01);
(Continued)

(58) Field of Classification Search
USPC .................................................. 726/4, 12, 29
See application file for complete search history.

(56) References Cited

U.S. PATENT DOCUMENTS 7,856,016 B2 * 12/2010 Shinomiya et al. ............ 370/389
7,874,005 B2 * 1/2011 Picolli .............................. 726/26
(Continued)

*Primary Examiner* — Jung Kim
*Assistant Examiner* — Tri Tran
(74) *Attorney, Agent, or Firm* — Oblon, McClelland, Maier & Neustadt, L.L.P.

(57) ABSTRACT

A broadband gateway may manage confidential data associated with users in a home network managed and/or serviced by the broadband gateway. The broadband gateway may store the user confidential data broadband gateway in a distributed manner, wherein the confidential data may be divided into a plurality of portions and stored separately in multiple storage locations or devices. When users authorize the transfer of the confidential data, all portions may be communicated to enable aggregating them such that the confidential data may be obtained. The user confidential data may be encrypted. The broadband gateway may securely communicate and/or share the user confidential user data. This may be achieved by tracking communication of the user confidential data, by using tags incorporated into the data. The broadband gateway may also ensure that communicated confidential data is rendered unusable under certain conditions, based on use for various timing tags for example.

20 Claims, 5 Drawing Sheets

(51) Int. Cl.
| | |
|---|---|
| *H04L 29/06* | (2006.01) |
| *H04W 12/08* | (2009.01) |
| *H04N 21/63* | (2011.01) |
| *H04L 12/28* | (2006.01) |
| *G06Q 20/10* | (2012.01) |
| *H04L 12/857* | (2013.01) |
| *G06Q 30/02* | (2012.01) |
| *G06F 21/10* | (2013.01) |
| *G06Q 40/00* | (2012.01) |
| *G05B 13/02* | (2006.01) |
| *G05F 1/66* | (2006.01) |
| *G06Q 30/04* | (2012.01) |
| *H04L 12/14* | (2006.01) |
| *H04L 12/66* | (2006.01) |
| *H04N 5/445* | (2011.01) |
| *H04N 21/482* | (2011.01) |
| *H04N 21/472* | (2011.01) |
| *H04L 29/08* | (2006.01) |
| *H04L 12/24* | (2006.01) |
| *H04N 21/258* | (2011.01) |
| *H04N 21/6543* | (2011.01) |

(52) U.S. Cl.
CPC ............. *H04L41/32* (2013.01); *H04L 41/5019* (2013.01); *H04L 65/4084* (2013.01); *H04L 67/104* (2013.01); *H04N 21/258* (2013.01); *H04N 21/47202* (2013.01); *H04N 21/6543* (2013.01)

(56) References Cited

U.S. PATENT DOCUMENTS

| | | | |
|---|---|---|---|
| 8,180,735 B2 * | 5/2012 | Ansari et al. ................... | 707/640 |
| 2004/0049700 A1 * | 3/2004 | Yoshida ......................... | 713/201 |
| 2005/0169303 A1 * | 8/2005 | Toma et al. .................... | 370/466 |
| 2006/0235931 A1 * | 10/2006 | Ruthe et al. ................... | 709/206 |

* cited by examiner

PROVIDING SECURE COMMUNICATION AND/OR SHARING OF PERSONAL DATA VIA A BROADBAND GATEWAY

CROSS-REFERENCE TO RELATED APPLICATIONS/INCORPORATION BY REFERENCE

This patent application makes reference to, claims priority to and claims benefit from U.S. Provisional Application Ser. No. 61/351,696 filed on Jun. 4, 2010. This application also makes reference to:

U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,933 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010; and
U.S. patent application Ser. No. 12/981,733 filed on Dec. 30, 2010.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communication. More specifically, certain embodiments of the invention relate to a method and system for providing secure communication and/or sharing of personal data via a broadband gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs) and/or mobile devices such as Smartphones. Furthermore, most households may have one or more televisions that may be used to view television broadcasts and/or multimedia content. Television broadcasts may include terrestrial TV, Cable-Television (CATV), satellite TV and/or Internet Protocol television (IPTV) based broadcasts. To protect against unauthorized reception and/or use of multimedia content, service providers may require use of dedicated set-top boxes (STBs) that may be used to encrypt broadcast signals communicated from the service providers to generate suitable video and/or audio streams that may be played via televisions and/or other display/playback devices in the household.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for providing secure communication and/or sharing of personal data via a broadband gateway, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
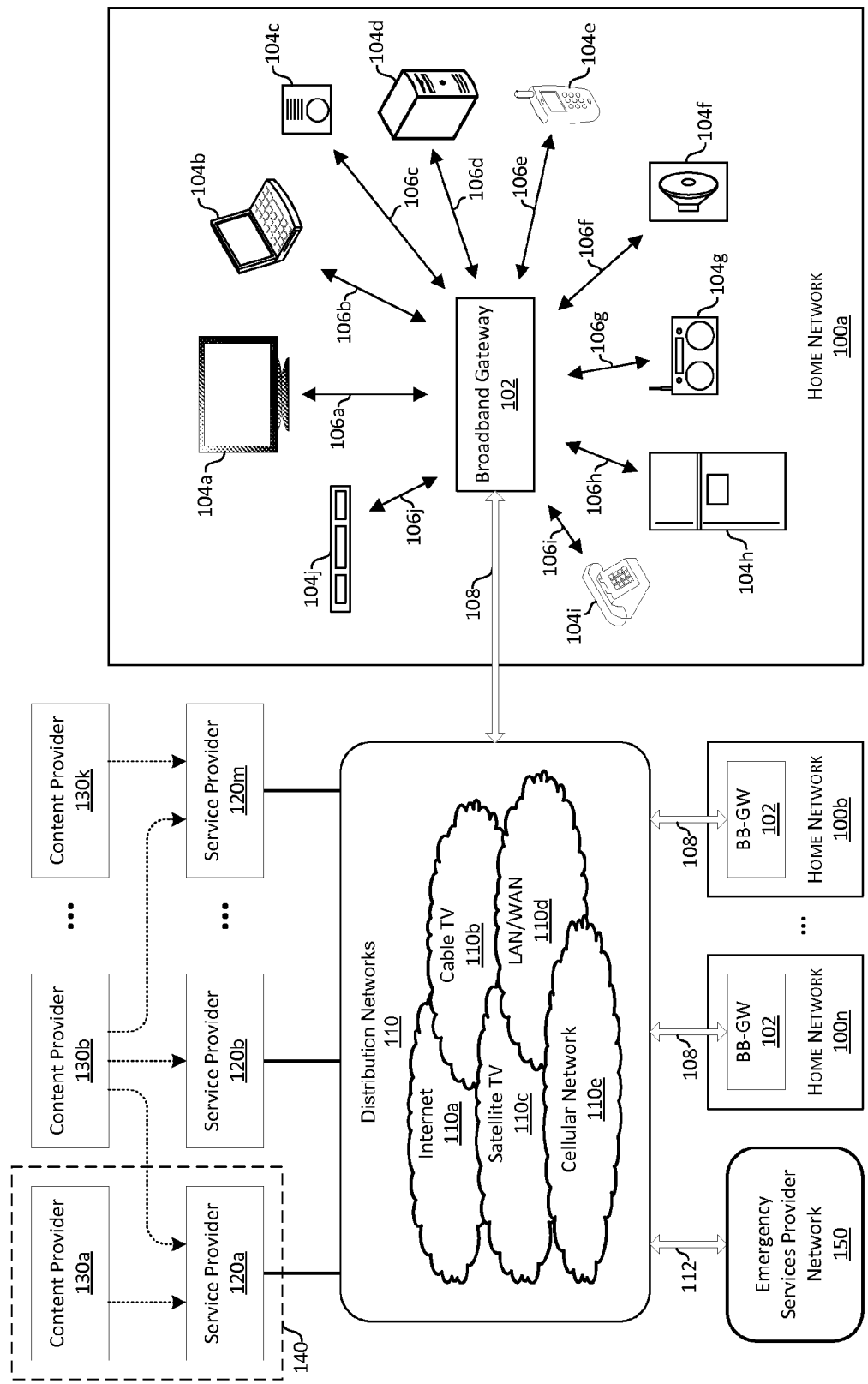
FIG. 1 is a block diagram illustrating an exemplary communication system that comprises a home network serviced by a broadband gateway, in accordance with an embodiment of the invention.

Certain embodiments of the invention may be found in a method and system for providing secure communication and/or sharing of personal data via a broadband gateway. In various embodiments of the invention, a broadband gateway, which may be communicatively coupled to a plurality of devices in a home network, and/or which may be operable to handle one or more physical layer connections to corresponding one or more network access service providers, may be utilized to manage confidential data associated with a user serviced by the broadband gateway, to protect the user confidential data against unauthorized access and/or reception. The user confidential data may comprise, for example, financial or transactional related information, and/or healthcare related information. Management of user confidential data may comprise encrypting the confidential data, using one or more encryption algorithms and/or protocols. The broadband gateway may provide decryption information corresponding to applied encryption algorithms, such as when a request for the user confidential data is received and authorized by the corresponding user. Management of user confidential data may also comprise securing communication of the user confidential data during the management of the user confidential data. In this regard, communication of the user confidential data may be secured by tracking the communicated user confidential data, by incorporating tags into one or more network packets utilized during that communication. The tags may require alerting the user and/or acknowledgment by the user in instances when one or more of the network packets are received and/or when the user confidential data is accessed during the secure communication.

Secure communication of user confidential data may also comprise incorporating one or more access control parameters into the network packets utilized in carrying the user confidential data, to enable rendering the communicated user confidential data and/or the network packets unusable when one or more conditions are met based on the incorporated access control parameters. In this regard, the communicated user confidential data, and/or the network packets, may be rendered unusable by means of deletion, decimation, corruption, and/or by making them inaccessible. For example, the access control parameters may comprise various timing parameters that may require deleting, decimating, corruption, and/or rendering the data inaccessible after certain duration. The broadband gateway may utilize distributing storage of the user confidential data during management of the user confidential data. In this regard, the distributed storage of user confidential data may comprise dividing the user confidential data into a plurality of portions, and storing the plurality of portions in a plurality of storage devices. The distributed storage may be utilized to facilitate secure communication of the user confidential data, by separately communicating each of the plurality of portions of the divided user confidential data from the plurality of storage devices or resources when the user confidential data is requested, only if authorized by the user. Accordingly, a recipient may obtain the user confidential data by aggregating the communicated plurality of portions.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120a-120m, and a plurality of content providers 130a-130k. The home network 100a may be serviced by a broadband gateway 102. Also shown in FIG. 1 are additional home networks 100b, . . . , 100n, and an emergency services provider network 150. Each of the home networks 100b, . . . , 100n may also be serviced by a broadband gateway 102.

The service providers 120a-120m may comprise various entities which may provide various services to broadband gateways 102 and/or to devices serviced by the broadband gateways 102, such as the plurality of home devices 104a-104j. Some of the service providers 120a-120m may comprise network access service providers which provide physical layer connections to the broadband gateway 102. Such physical layer connections may then be utilized to access content provided by the content providers 130a-130k, access services provided by other ones of the service providers 120a-120m, and/or access an intranet or the Internet at-large. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers. In an exemplary embodiment of the invention, the broadband gateway 102 may enable connecting to multiple service providers 120a-120m to facilitate receiving content originating from one or more of the content providers 130a-130k.

The content providers 130a-130k may comprise various entities and/or networks which may generate, capture, and/or package content that may be distributed to end-users (i.e. "subscribers"), via the service providers 120a-120m and/or the distribution networks 110. In this regard, content may comprise audio, video, multimedia, e-book, gaming, and/or other content. Exemplary content providers may comprise commercial providers of multimedia content, such as major film or television production and/or distribution companies (e.g. Paramount Pictures or Warner Bros.), and/or providers of personal content (e.g. user-generated content). In some instances, as demonstrated by dashed line 140, content and service providers may be merged as singular entities that may provide both content and network access servicing, which may be used to delivering the offered content. The content may be, for example, downloadable and/or streaming, rented and/or purchased. Content originating from the content providers 130a-130k may be distributed to the end-users (e.g. consumers) by the service providers 120a-120m. In some instances, content providers 120a-120m and service providers 120a-120m may be separate entities. In some instances, however, a single provider may provide both content and services, as demonstrated by dashed line 140 for example. That is, an entity that functions as a network access service provider may also provide content and/or services other than network access and, thus, that entity may also be accurately referred to as a "content provider" and/or a "service provider." The content and/or services that are provided by the content provider and/or the service provider may be provided to the broadband gateways 102 via one or more physical connections provided by a network access service provider.

The plurality of distribution networks 110 may comprise one or more networks that may be operable to enable wireless and/or wired communication among a plurality of local and/or remote entities, based on one or more networking and/or communication infrastructures. In this regard, the plurality of distribution network 110 may be utilized to enable distributing multimedia content generated by the content providers 130a-130k, directly and/or via the service providers 120a-120m, to end-users. The network connectivity available via the plurality of distribution networks 110 may be based on one or more communication standards and/or protocols. The plurality of distribution networks 110 may comprise, for example, Internet 110a, the Cable Television (CATV) network 110b, Satellite Television (TV) network 110c, wireless local network area/wide network area (LAN/WAN) 110d, and/or cellular network 110e.

The Internet 110a may comprise a system of interconnected networks to enable exchange of data among a plurality of nodes, based on one or more networking standards, including, for example, the Internet Protocol (IP). The Internet 110a may enable connectivity among a plurality of private and public, academic, business, and/or government nodes and/or networks. The physical connectivity in the Internet 110a may be provided via, for example, the Public Switched Telephone Network (PSTN), copper wires, fiber-optic cables, wireless interfaces, and/or other protocols and/or standards-based interfaces. The transport functionality in the Internet 110a may be performed based on, for example, one or more transport protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

Each of the home networks 100a-100n may correspond to a location that may comprise a plurality of devices, such as a plurality of home devices 104a-104j in the home network 100a, which may be serviced and/or managed by an instance of the broadband gateway 102. In this regard, the location may be a residence (e.g., home, apartment), a small business, a school, a library, and/or other like settings in which users may want to obtain access to service and/or to content provider networks. The broadband gateway 102 may be utilized in a home network, such as the home network 100a, to provide connectivity between the home network and one or more of the service providers 120a-120m (and/or one or more of the content providers 130a-130k) via the distribution networks 110.

The broadband gateway 102 may comprise suitable logic, circuitry, interfaces, and/or code that may be operable to implement various aspects of the invention. In this regard, the broadband gateway 102 may be operable to communicate with the content providers 130a-130k, the service providers 120a-120m, and the plurality of home devices 104a-104j. In this manner, the broadband gateway 102 may enable bidirectional communication of content and/or other information between the content providers 130a-130k, the service providers 120a-120m and the devices 104a-104j. Communications between the broadband gateway 102 and service providers 120a-120m (and/or the content providers 130a-130k) may be carried over optical, wired, and/or wireless links of the distribution network(s) 110. Similarly, Communications between the broadband gateway 102 and the devices 104a-

104*j* may be carried over optical, wired, and/or wireless links. In an exemplary aspect of the invention, a single broadband gateway 102 may be operable to handle multiple physical layer (i.e., layer 1 of the open-systems interconnection model (OSI)) connections 108 to multiple ones, or portions, of the distribution network(s) 110, where different ones or portions of the distribution network(s) 110 may be owned, operated, leased, or otherwise associated with different ones of the network access service providers 120*a*-120*m*. For example, a first network access service provider may provide network access to the broadband gateway 102 via a DSL connection over twisted-pair cabling, and a second network access service provider may provide network access to the broadband gateway 102 via a cable television connection over coaxial cabling. In some instances, the broadband gateway 102 may be operable to concurrently communicate over the multiple physical layer connections provided by the multiple network access service providers.

The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers 130*a*-130*k*, wherein the content may be delivered through one or more services providers 120*a*-120*m*. For example, the broadband gateway 102 may be operable to perform such operations as network access related processing (e.g. PHY/MAC, and/or transport layer processing), encryption and/or decryption, user and/or account authentication, and/or at least some of video and/or audio processing operations which may be necessary for consumption of multimedia content.

The broadband gateway 102 may communicate with various devices in the home networks using optical, wired and/or wireless communication links. Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with the plurality of home devices 104*a*-104*j* in the home network 100*a*. The home devices may comprise, for example, one or more of a television 104*a*, a laptop computer 104*b*, a smoke detector, a carbon monoxide detector, and/or a security alarm 104*c*, a computer and/or server 104*d*, a mobile phone 104*e*, a speaker 104*f*, an AM/FM radio 104*g*, an appliance 104*h* (e.g., refrigerator), a phone 104*i*, and a digital video recorder (DVR) or personal video recorder (PVR) 104*j*. The broadband gateway 102 may interact with each of the home devices 104*a*-104*j* via corresponding links 106*a*-106*j*, which may be supported by the broadband gateway 102 and the corresponding home device. For example, the link 106*a* between the broadband gateway 102 and the television 104*a* may comprise a High-Definition Multimedia Interface (HDMI) cable. The link 106*b* may comprise, for example, a wired Ethernet link, a wireless Ethernet link, a Universal Serial Bus (USB) link, or an IEEE 1394 link. The link 106*c* may comprise, for example, a two-wire link or a wireless link. The link 106*d* may comprise, for example, a wired Ethernet link, a wireless Ethernet link, a USB link, or an IEEE 1394 link. The link 106*e* may comprise, for example, a wireless Ethernet link, a USB link, or a cellular link. The link 106*f* may comprise speaker wire and/or a wireless link. The link 106*g* may comprise, for example, AM and/or FM radio transmissions broadcast received using the broadband gateway 102. The link 106*h* may comprise, for example, a wired or wireless link. The link 106*i* may comprise, for example, a phone line. The link 106*j* may comprise, for example, a wired or a wireless link.

The broadband gateway 102 may also be operable to provide and/or support various other, non-content related services in the home network 100*a*. The broadband gateway 102 may provide, for example, emergency-related services in the home network 100*a*. For example, the emergency services provider network 150 may be connected to the distribution networks 110 via a link 112. The emergency services provider network 150 may be associated with one or more emergency service provider entities. For example, a public entity such as a 911 center and/or a private entity such as a security company may be able to interact with the broadband gateway 102 in the home network 100*a* via the distribution networks 110.

While the broadband gateway 102 is shown in FIG. 1 as a single and separate device, the invention need not be so limited. In one embodiment of the invention, the broadband gateway functionality may be implemented in a distributed manner over two or more devices. Furthermore, the broadband gateway may be implemented as a virtual platform, for example in instances where it may be implemented in distributed manner. In another embodiment of the invention, some or all of the functionality of the broadband gateway may be implemented within one of the televisions available in the home.

As illustrated in FIG. 1, a plurality of home networks 100*b*, . . . , 100*n*, may also be connected to the distribution networks 110. These home networks 100*b*, . . . , 100*n* may operate in substantially the same manner as the home network 100*a*. By having multiple home networks connected to the distribution networks 110, various applications, such as peer-to-peer communication and/or data aggregation operations may be possible by utilizing the broadband gateways 102 in the home networks.

In operation, the broadband gateway 102 may be utilized as an interface device that may allow one or more service providers 120*a*-120*m*, content providers 130*a*-130*k*, and/or emergency service provider networks 150 to interact with various devices in a home network, such as in the home network 100*a*. In this regard, the broadband gateway 102 may support configuring and/or using the plurality of broadband connections 108. The broadband connections 108 may comprise optical, wired and/or wireless connections between the broadband gateway 102 and the distribution networks 110, to enable communication between the broadband gateway 102 and the service providers 120*a*-120*m*, content providers 130*a*-130*k*, and/or emergency service provider networks 150 for example. The broadband gateway 102 may be operable to perform and/or provide various services that may pertain to enabling and/or facilitating reception of data, such as multimedia content, for example, from one or more content providers, wherein the content may be delivered through one or more services providers. The broadband gateway 102 may distribute the received content to one or more devices in a home network, for consumption, and/or may perform, directly and/or indirectly using other devices, any processing and/or operations (e.g., decryption and/or account validation) that may be needed to ensure that the content may be consumed by the target home device(s).

The broadband gateway 102 may also provide and/or support various other services in the home network 100*a* beyond reception and/or download of content. For example, the broadband gateway 102 may be operable to provide energy management in the home network 100*a*, by controlling and/or adjusting configuration of one or more devices in the home network to reduce power consumption for example. The broadband gateway 102 may also provide emergency-related services in the home network 100*a*, including allowing first responders to provide alerts to a select group of users by accessing the broadband gateway 102 via secure links provided by the service/content providers.

In various embodiments of the invention described herein, the broadband gateway 102 may provide management of user confidential data. Exemplary confidential data may comprise financial or transactional information, and/or information that may be utilized in conjunction with healthcare related services and/or activities, such as medical records. Management of user confidential data may comprise utilizing and/or incorporating various techniques and/or means to secure storage of user confidential data, and/or to ensure that user confidential data is communicated external to the home network 100*a* in a secure manner. For example, a user associated with the broadband gateway 102 within the home network 100*a* may generate and/or update, via one or more of the home devices 104*a*-104*j*, user related information. In this regard, users may communicate the user related information to the broadband gateway 102, using one or more of the home devices 104*a*-104*j* and a corresponding one or more the links 106*a*-106*j*. In some instances, the user related information may comprise confidential data, which users may desire to protect against unauthorized, unintended and/or malicious, access and/or reception thereof. Accordingly, the broadband gateway 102 may be configured and/or utilized to control and/or manage storage and/or sharing of user confidential data, to guard against any such unauthorized access or reception of user confidential data.

The user confidential data may be secured by, for example, encrypting that information. In this regard, the broadband gateway 102 may be configured to perform the necessary encryption operations. Selection of the encryption algorithms may be performed autonomously by the broadband gateway 102, and/or based on user input. Once encrypted, user confidential data may not be accessed without using appropriate decryption information. The decryption information may comprise, for example, data identifying utilized encryption algorithm(s), and/or any necessary encryption/decryption keys used therewith. Exemplary encryption algorithms may comprise public-key based algorithms, such as RSA, symmetric key algorithms, such as Advanced Encryption Standard (AES), block ciphering based algorithms, such Data Encryption Standard (DES), and/or hash based algorithms, such as Secure Hash Algorithm (SHA). Users may maintain the decryption information, and may directly provide the decryption information when requested. The decryption information may also be maintained in the broadband gateway 102, with users controlling, wholly or partially, how and/or when the decryption information may be provided. The decryption information may be provided as part of user authorization of confidential data access and/or reception. In one exemplary embodiment of the invention, the decryption information may also be encrypted, using a different encryption algorithm, to further enhance protection of the user confidential data.

The broadband gateway 102 may be operable to provide secure storage of user confidential data. In this regard, the broadband gateway 102 may store confidential data received from users serviced by the broadband gateway 102 in the home network 100*a*. The broadband gateway 102 may directly maintain the confidential data, that is, storing it directly within the broadband gateway 102. The broadband gateway 102 may also store the confidential data in a device coupled to the broadband gateway 102, such as one of the home devices 104*a*-104*j*. For example, the broadband gateway 102 may store the confidential data in the server 104*d*. In one embodiment of the invention, the broadband gateway 102 may utilize distributed storage when storing the confidential data. In this regard, the distributed storage of user confidential data may comprise splitting and/or dividing the confidential data, via the broadband gateway 102 for example, into a plurality of portions, which may be stored separately in multiple storage locations and/or devices.

The multiple storage locations and/or devices may be located within the home network 100*a*. For example, the broadband gateway 102 may split the confidential data into two portions, which may then be stored in the laptop computer 104*b* and the server 104*d*, respectively. One or more of the multiple storage locations and/or devices may also be located outside the home network 100*a*, however. In this regard, the broadband gateway may communicate portions that are to be stored external storage location and/or devices via one of more of the plurality of different broadband connections 108. In instances where the confidential data may be encrypted, the confidential data may be encrypted prior to its storage, and the confidential data, and/or any portions thereof, may then be stored as encrypted data.

The broadband gateway 102 may also be operable to provide secure communication and/or sharing of user confidential data outside the home network 100*a*. For example, in instances where use confidential data comprise healthcare related information, users may desire to communicate this information to healthcare providers for example, but only if that is be done in a manner that may ensure that the communicated information would not be received, intercepted and/or otherwise accessed without authorization, and/or by entities not intended to receive or access it. Accordingly, the broadband gateway 102 may utilize and/or incorporate various mechanisms to ensure that user confidential data is communicated and/or shared securely. For example, the broadband gateway 102 may utilize tracking based communication of confidential data. In this regard, tags may be incorporated into network packets carrying the confidential data, or into the confidential data itself, to enabling tracking communicated confidential as it traverses the network. The incorporated tags may require, for example, alerting users associated with the communicated, every time the communicated confidential data is received and/or accessed for example. The tags may also require that users associated with the communicated confidential data acknowledge the reception of the alert messages. Furthermore, in instances where the communicated confidential data may be encrypted, acknowledgement responses may also incorporate and/or carry the decryption information necessary to decrypt the confidential data.

In one embodiment of the invention, secure communication and/or sharing of user confidential data may also comprise use of mechanisms that may ensure that the communicated confidential data, and/or network packets carrying that confidential data, may be rendered unusable under certain conditions. In this regard, the communicated confidential data, and/or the network packets used during any such communication may be rendered unusable by deletion, decimation, corruption, and/or by making them inaccessible. For example, the broadband gateway 102 may utilize and/or incorporate timing and tracking parameters or tags into network packets carrying the confidential data, and/or into the confidential data itself to require deleting, decimating, corrupting, and/or rendering the data inaccessible. In this regard, the confidential data and/or the network packets carrying the confidential data may be deleted, decimated, corrupted, and/or rendered inaccessible, after traversing the network for a predetermined duration.

In one embodiment of the invention, secure communicate and/or sharing of user confidential data may also be achieved by utilizing distributed storage of the confidential data. Dividing and/or splitting the confidential data into a plurality of portions stored in multiple storage locations and/or devices may ensure that unauthorized entities advertently or maliciously receiving may only be able to obtain portions of the confidential data. In this regard, only when users authorize the transfer and/or sharing of the confidential data, intended recipients may be able to receive all the portions, and/or to aggregate the portions to obtain the confidential data. Furthermore, in instances where the confidential data may be encrypted, the decryption information necessary to decrypt the confidential data may only be provided, by the user and/or the broadband gateway 102, as part of user authorization procedure.

Figure 2:
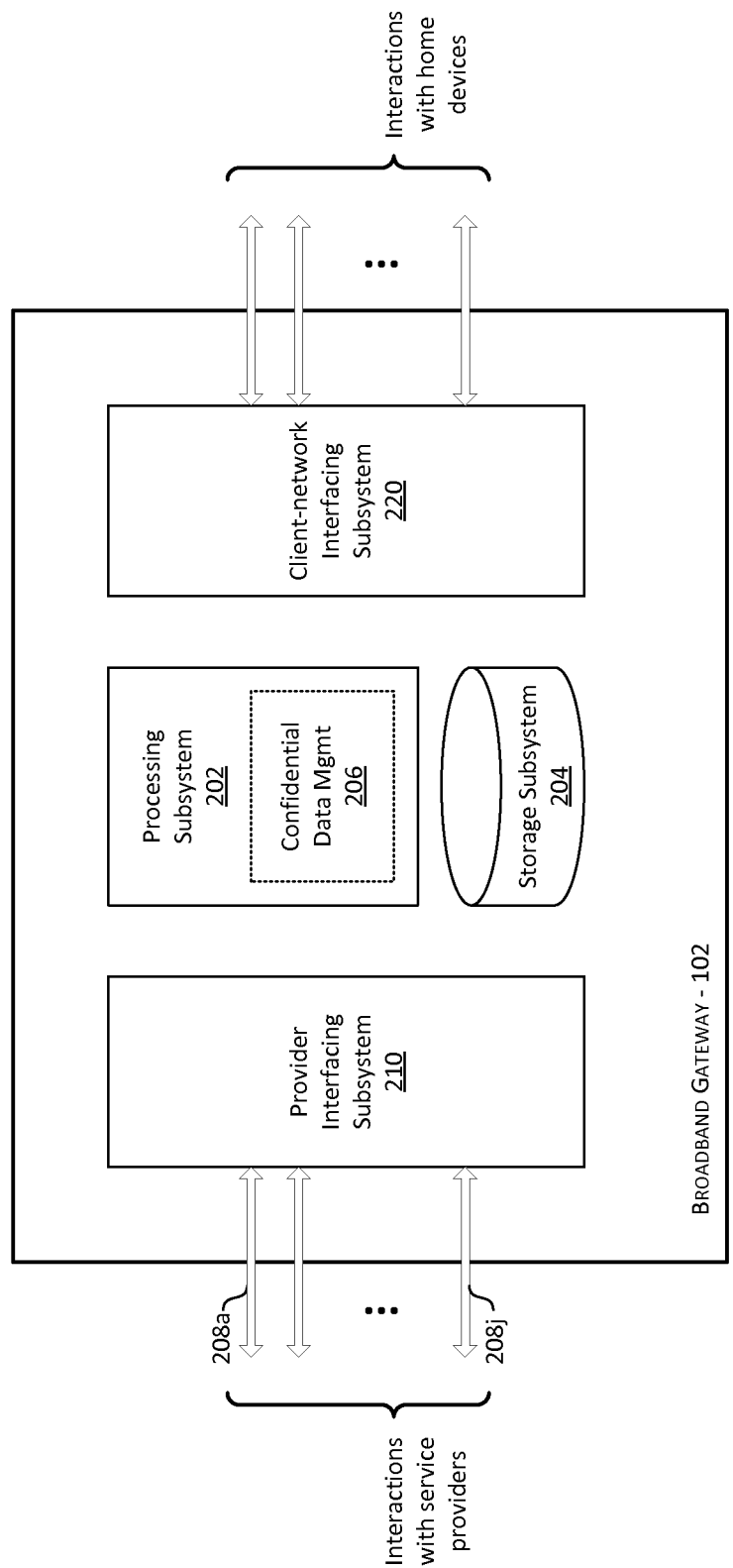
FIG. 2 is a block diagram illustrating an exemplary broadband gateway, in accordance with an embodiment of the invention.

FIG. 2 is a block diagram illustrating an exemplary broadband gateway, in accordance with an embodiment of the invention. Referring to FIG. 2, there is shown a broadband gateway 200 that may be substantially similar to the broadband gateway 102 described above with respect to FIG. 1.

The broadband gateway 200 may comprise suitable logic, circuitry, code, and/or interfaces that may be operable to provide connectivity between one or more external networks, such as the distribution networks 110 shown in FIG. 1, for example, and one or more devices in a home network, such as the home devices 104a-104j in the home network 100a shown in FIG. 1. In this regard, the broadband gateway 200 may operate as an interface device that allows one or more service providers 120a-120m, one or more content providers 130a-130k, and/or emergency service providers 150, to interact with various devices in a home network serviced by the broadband gateway 200, and/or among the home devices themselves within the serviced home network.

The broadband gateway 200 may interact with serviced devices in a home network, such as the home network 100a, via wired and/or wireless communication links, to support communicating between the broadband gateway 200 and the home devices, and/or among the home devices via the broadband gateway 200. In this regard, the broadband gateway 200 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 200 may communicate with the various devices in the home via more than one home network.

The broadband gateway 200 may comprise a plurality of modules, each of which may comprise hardware, software, or a combination thereof that may be utilized to perform various operations associated with the broadband gateway 200. For example, in an embodiment of the invention, shown in FIG. 2, the broadband gateway 200 may comprise a processing subsystem 202, a storage subsystem 204, a provider interfacing subsystem 210, and a client-network interfacing subsystem 220. In some instances, the broadband gateway 200 may be such that the various modules listed above may be distributed over multiple devices. Moreover, the modules listed above are provided by way of illustration and not of limitation. Other configurations and/or architectures of the broadband gateway 200 may be implemented. For example, the broadband gateway 200 may be a virtual gateway setup in a network by utilizing virtual machines (VMs) and/or next-generation (NG) data centers.

The processing subsystem 202 may comprise suitable logic, circuitry, interfaces, and/or code that may be operable to process data received from the service and/or content providers and/or data received from one or more devices in the home network 100a. In this regard, the processing subsystem 202 may comprise one or more portions that are suitable to handle certain types of data such as video data and/or audio data, for example. The processing subsystem 202 may also be operable to control and/or manage operations of the broadband gateway 200, and/or performing tasks and/or applications therein. For example, the processing subsystem 202 may enable execution of applications, programs and/or code, which may be stored in the storage subsystem 204 for example. In this regard, the processing subsystem 202 may be operable to configure and/or control operations of various components and/or subsystems of the broadband gateway 200, and/or other devices managed by and/or connected to broadband gateway 200, by utilizing, for example, one or more control signals. The processing subsystem 202 may also control data transfers within the broadband gateway 200, in the course of performing various applications and/or tasks for example. The processing subsystem 202 may comprise, for example, a plurality of processors, which may be general and/or specialized processors (e.g. CPU, video processors, and/or audio processors). While the processing subsystem 202 is shown herein as a single block, the invention needs not be so limited. Accordingly, in instances where the broadband gateway 200 is implemented a distributed platform, some of the operations and/or functions described herein with regard to the processing subsystem 202 may be performed by different components that may be located in different devices.

In an exemplary aspect of the invention, the processing subsystem 202 may comprise a confidential data management module 206. In this regard, the confidential data management module 206 may comprise suitable logic, circuitry, interfaces, and/or code that may be operable to perform, control, and/or support management of users confidential data via the broadband gateway 200, substantially as described with regard to FIG. 1. In this regard, the confidential data management module 206 may be operable to control and/or manage encryption of user confidential data, secure storage of user confidential data, and/or secure communication and/or sharing of user confidential data.

The storage subsystem 204 may comprise suitable logic, circuitry, interfaces, and/or code that may be operable to store data utilized in the operations of the broadband gateway 200. In this regard, the storage subsystem 204 may comprise one or more memory devices that may enable permanent and/or non-permanent storage, buffering, and/or fetching of data, code and/or other information which may be used, consumed, and/or handled in the broadband gateway 200. For example, the storage subsystem 204 may be utilized to store configuration data, parameters, device information, tracking and/or monitoring information, security information, and intermediate processing data, for example. The storage subsystem 204 may comprise storage media integrated in the broadband gateway 200 and/or one or more removable storage devices. The storage subsystem 204 may comprise different memory technologies, including, for example, read-only memory (ROM), random access memory (RAM), and/or Flash memory. In an exemplary aspect of the invention, the storage subsystem 204 may be utilized to store confidential data management related information and/or code, which may be utilized in conjunction with confidential data management related services provided by, and/or operations performed by the broadband gateway 200, substantially as described with regard to FIG. 1.

The provider interfacing subsystem 210 may comprise suitable logic, circuitry, interfaces, and/or code that may be operable to communicate data via one or more physical layer connections 208a-208j, to one or more corresponding network access service providers via the distribution networks 110 for example. The provider interfacing subsystem 210 may be operable to support multiple communication protocols, standards, and/or data transport technologies. In this regard, each of the physical layer connections 208a-208j may connect the gateway 200 to different network access service provider, and may comprise a wired, optical, or wireless connection. Each of the physical layer connections 208a-208j may utilize different physical media and/or different physical layer protocols. For example, the connection 208a may comprise a DSL over twisted-pair connection whereas and the connection 208j may comprise a CATV over coaxial cable connection. Accordingly, the provider interfacing subsystem 210 may enable accessing and/or communicating with one or more service providers 120a-120m and/or content providers 120a-120m, via the distribution networks 110. The provider interfacing subsystem 210 may also be utilized to communicate data to and/or from third parties. In this regard, the provider interfacing subsystem 210 may enable gateway-to-gateway communication and/or interactions between the broadband gateway 200 and communication devices located outside the home network 100a, directly and/or indirectly through distribution networks corresponding to one or more service providers. The provider interfacing subsystem 210 may enable concurrently communicating with multiple and/or different service/content providers and/or devices.

The client-network interfacing subsystem 220 may comprise suitable logic, circuitry, interfaces, and/or code that may be operable to send data to one or more devices in the home network serviced and/or managed by the broadband gateway, such as the home network 100a. The client-network interfacing subsystem 220 may also be operable to receive data from one or more devices in the home network 100a. The client-network interfacing subsystem 220 may be operable to support multiple communication protocols, standards, and/or data transport technologies. For example, the client-network interfacing subsystem 220 may support the links 106a-106j.

In operation, the broadband gateway 200 may be utilized as an interface device that may interact with a plurality of devices in a home network, such as such as the devices 104a-104j in the home network 100a, and/or may provide connectivity between the devices in the home network and service and/or content providers. The broadband gateway 200 may also interact with a plurality of home devices in a home network, such as the devices 104a-104j in the home network 100a, using the client-network interfacing subsystem 220. In this regard, the client-network interfacing subsystem 220 may support use of one or more of the links 106a-106j. Furthermore, the broadband gateway 200 may interact with one or more service providers 120a-120m via the provider interfacing subsystem 210, to enable exchanging messages and/or content for example, via one or more of the distribution networks 110. Accordingly, the broadband gateway 200 may enable and/or facilitate obtaining content (e.g. multimedia content) from one or more content providers 130a-130k, wherein the content may be delivered through one or more services providers 120a-120m. The broadband gateway 200 may distribute the received content to one or more of the plurality of home devices 104a-104j, for content consumption, and/or may perform, directly via the processing subsystem 202 and/or indirectly utilizing other devices communicatively coupled to the broadband gateway 200, any processing and/or procedures (e.g. decryption and/or account validation) that may be necessary to ensure that the content may be consumed by the home device(s).

The broadband gateway 200 may be operable to run or execute an agent to extract content, rating, copyright, language, privacy rules, and automatically add user generated content, for example. Such agent may be run or executed in connection with the processing subsystem 202 of the broadband gateway 200, for example. Furthermore, the broadband gateway 200 may be operable to combine and/or blend multiple contents for use as single content in the home network. Such combination may be performed in one or more of the modules of the broadband gateway 200. For example, the broadband gateway 200 may blend different video and audio contents for an event by accessing one or more service/content providers and providing automatic and/or manual content synchronization.

The broadband gateway 200 may also provide various services and/or tasks beyond, in addition to, and/or in conjunction with content delivery to home devices. For example, the broadband gateway 200 may perform content search, transport discovery, ranking, and/or sorting. In this regard, some operations may be performed based on content quality, price, quality-of-service (QoS), and network protocols supported by the devices in the home network, such as service level agreements (SLAs), for example.

The broadband gateway 200 may provide user interface services in the home network. In this regard, the broadband gateway 200 may be operable to support user interfaces, and/or to generate and/or store data corresponding thereto, which may be utilized to enable interactions between the broadband gateway 200 and users, such as in the home network 100a for example. Exemplary user interfaces may comprise graphic user interfaces (GUIs), which may enable visually displaying and/or providing interaction with users, to provide visual interaction with customized content for example. Information inputted and/or outputted using the user interfaces may be stored in the broadband gateway 200, via the storage subsystem 204 for example. The user interfaces may enable configuring the broadband gateway 200, and/or any applications and/or services provided thereby, and/or may also be utilized to configure and/or adjust other devices in the home network 100a. GUIs, and like interfaces, may be displayed using one or more devices coupled to the broadband gateway 200. For example, interfaces generated and/or used by the broadband gateway 200 may be displayed using the television 104a.

The broadband gateway 200 may also be utilized to create, maintain, and/or update a plurality of profiles corresponding to users, devices, and/or services available in the home network 100a. Furthermore, user interfaces supported and/or used by the broadband gateway 200 may be utilized to enable displaying and/or modifying user, device, and/or service profiles. Data corresponding to these profiles may be stored in the storage subsystem 204 of the broadband gateway 200. For example, device-profiles may be utilized to store information associated with particular devices that may be coupled to and/or serviced by the broadband gateway 200. In this regard, device-profiles may be utilized for storage of information pertaining to device capabilities, limitations, requirements, and/or configuration parameters therefor. User-profiles may be utilize to store information associated with particular users, such as setting preferences for various devices and/or services that may be utilized by a particular user in conjunction with the broadband gateway 200. The broadband gateway 200 may utilize user and/or home device profile information to, for example, select layered video service(s) and/or transmission. In some instances, the programming and/or enhanced video layers received by the broadband gateway 200 may be aggregated midstream by one or more network or routing nodes.

The gateway functionality associated with a user, such as security features, preferences, applications, electronic programming guides (EPGs), and user profile, for example, may be ported from the broadband gateway 200 to one or more other broadband gateways 200 in other locations. In some instances, a visitor may be allowed access to their content outside their service/content provider service area by, for example, classifying the access level for different users and/or by providing limited access to content. Moreover, the broadband gateway 200 may allow multiple user interface software structures by, for example, standardizing an interface to service/content providers and devices in the home network.

In various embodiments of the invention, the broadband gateway 200 may provide, via the user confidential data management module 206 for example, management of user confidential data, substantially as described with regard to FIG. 1, for example. In this regard, the broadband gateway 200 may be configured and/or utilized to control and/or manage storage and/or sharing of user confidential data, to guard against any such unauthorized access or reception of user confidential data. The broadband gateway 200 may be operable to encrypt managed user confidential data. In this regard, the user confidential data management module 206 may be configured to select one or more encryption algorithms, and/or perform, via the processing subsystem 202 for example, necessary encryption operations on managed user confidential user data based thereon, substantially as described with regard to FIG. 1. Once encrypted, user confidential data may not be accessed without using appropriate decryption information, which identified encryption algorithm(s) applied to the user confidential data, and/or may provide parameters required to decrypt that data, such as decryption keys used therewith for example. In this regard, the user confidential data management module 206 may generate and/or update the decryption information, and/or may maintain it, in the storage subsystem 204, for example.

The broadband gateway 200 may provide, via the user confidential data management module 206, secure storage of user confidential data, substantially as described with regard to FIG. 1. In this regard, the broadband gateway 200 may store user confidential data received from users serviced by the broadband gateway 200. The broadband gateway 200 may directly maintain the user confidential data, by storing it within storage subsystem 204 for example. The broadband gateway 200 may also store at least a portion of managed user confidential data in one or more storage locations and/or devices which may be communicatively coupled to the broadband gateway 200, substantially as described with regard to FIG. 1. In this regard, the broadband gateway 200 may communicate with the storage locations and/or devices via the client-network interfacing subsystem 220 or the provider interfacing subsystem 210, based on whether the storage locations and/or devices are located within the home network or outside it, respectively.

The broadband gateway 200 may also be operable to provide secure communication and/or sharing of user confidential data, substantially as described with regard to FIG. 1. In this regard, the broadband gateway 200 may utilize and/or incorporate various mechanisms to ensure that user confidential data is communicated and/or shared securely. For example, the broadband gateway 200 may utilize, via the user confidential data management module 206, tracking based communication of user confidential data. In this regard, the user confidential data management module 206 may incorporate tags into network packets carrying the user confidential data to enabling tracking communicated confidential as it traverses the network. The incorporated tags may require, for example, alerting users associated with the communicated, every time the communicated user confidential data is received and/or accessed for example, and/or may also require that users associated with the communicated user confidential data acknowledge the reception of the alert messages.

Secure communication and/or sharing of user confidential data may also comprise use of mechanisms that ensure the communicated confidential may become unusable under certain conditions. In this regard, communicated confidential data, and/or the network packets utilized in communicating the confidential data, may be rendered unusable by means of deletion, decimation, corruption, and/or by making them inaccessible. For example, the user confidential data management module 206 may calculate or estimate a duration of communication, based on prior interactions with requesting entities for example, and/or may incorporated timing parameters and/or tags the communicated confidential data, and/or into network packets carrying the user confidential data, to cause deletion, decimation, and/or corruption, and/or rendering inaccessible the communicated confidential data and/or the network packets after traversing the network for the predetermined duration.

The broadband gateway 200 may also be operable to utilized distributed storage of the user confidential data in conjunction with communication and/or sharing of the user confidential data. In this regard, the user confidential data may be stored as a plurality of portions, stored in multiple storage locations and/or devices. Accordingly, only when users authorize communication and/or sharing of the user confidential data, does the broadband gateway 200 trigger communication of each of the portions, via the provider the provider interfacing subsystem 210 for example, to enable aggregating the portions to obtain the user confidential data. Furthermore, in instances where the user confidential data may be encrypted, the broadband gateway 200 may also communicate the decryption information.

Figure 3A:
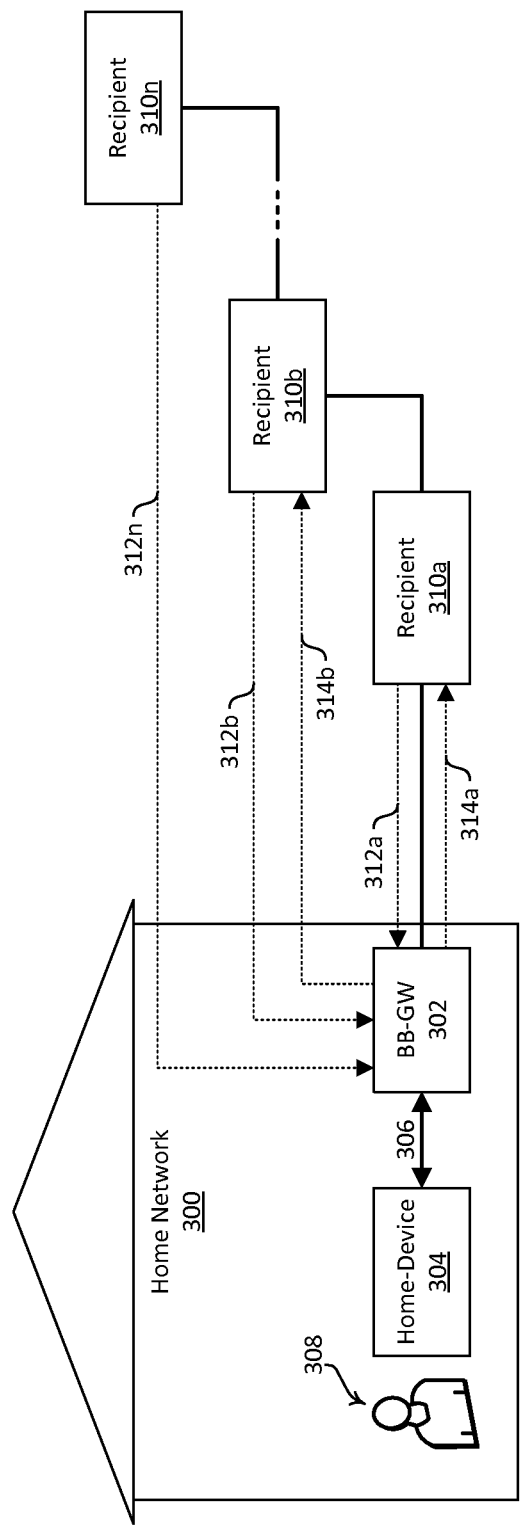
FIG. 3A is a block diagram illustrating an exemplary tracking based secure communication of user confidential data via a broadband gateway, in accordance with an embodiment of the invention.

FIG. 3A is a block diagram illustrating an exemplary tracking based secure communication of user confidential data via a broadband gateway, in accordance with an embodiment of the invention. Referring to FIG. 3A, there is shown a home network 300, which may comprise a broadband gateway 302 and a home device 304. Also shown in FIG. 3A is a plurality of recipients 310a-310n.

The broadband gateway 302 may be similar to the broadband gateway 102, substantially as described with regard to FIGS. 1 and 2, and may be utilized similarly to service and/or manage the home network 300, which may be similar to the home network 100a of FIG. 1. In this regard, the home network 300 may comprise a plurality of home devices which may be serviced and/or managed by the broadband gateway 302, of which the home device 304 is shown. The home device 304 may be similar to one or more of the home devices 104a-104j of FIG. 1. The home device 304 may comprise, for example, a desktop computer or smartphone. The home device 304 may communicate with the broadband gateway 302 via a link 306, which may be similar to one or more of the links 106a-106j of FIG. 1. In this regard, the link 306 may comprise, for example, a wired Ethernet link, a wireless Ethernet link, a USB link, or an IEEE 1394 link. The broadband gateway 302 may be utilized to service a plurality of users in the home network 300, of which user 308 is show. In this regard, the user 308 may utilize the home device 304 to interact with the broadband gateway, and/or to utilize services and/or applications provided by the broadband gateway 302.

Each of the recipients 310a-310n may comprise suitable logic, circuitry, interfaces, and/or code that may be operable to communicate and/or interact with the broadband gateway 302, via the distribution networks 110 for example (not shown). In this regard, one or more of the recipients 310a-310n may correspond to entities providing certain services, such as healthcare or financial services, and may communicate with consumers and customers, using communication devices such as computers or servers for example,/// new sentence/// and may utilize the user confidential data in conjunction with providing services to corresponding customers. In this regard, the recipient 310a may correspond to, for example, a financial institution, such as a bank, whereas the recipient 310b may correspond to a healthcare provider, such as a hospital or a personal physician clinic. In some instances, however, the one or more of the recipients 310a-310n may correspond to an entity receiving user confidential data inadvertently, and/or seeking to obtain user confidential data in unauthorized manner, such as a hacker for example.

In operation, the broadband gateway 302 may be utilized to service and/or manage the home network 300, substantially as described with regard to FIG. 1 for example. In this regard, the broadband gateway 302 may be utilized to provide management of confidential data associated with users in the home network 300, such as the user 308 for example. The broadband gateway 302 may receive user confidential data associated with the user 308, which may be provided by the user 308 using the home device 304, and then communicated to the broadband gateway 302 via the link 306. The user confidential data may comprise financial information, which the user 308 may provide to financial service providers, such as the recipient 310a, and/or healthcare related information, which the user 308 may provide to healthcare providers such as recipient 310b. The broadband gateway 302 may encrypt the user confidential data, substantially as described with regard to FIGS. 1 and 2, to protect that information in instances where it may be accessed by and/or communicated by unintended and/or unauthorized recipient(s). In this regard, the confidential data may only be utilized after it has been properly decrypted, based on decryption information provided by, for example, the user 308.

The broadband gateway 302 may ensure secure communication and/or sharing of user confidential data. For example, the broadband gateway 302 may utilize tracking based mechanisms to ensure secure communication of user confidential data associated with the user 308. In this regard, during communication of user confidential data, the broadband gateway 302 may incorporate tags into network packets carrying the confidential data, or into the confidential data itself, to enable tracking communicated confidential as it traverses the network. The incorporated tags may require each recipient 310 to transmit back to the broadband gateway 302 an alert message 312 whenever that recipient receives a network packet carrying the confidential data, or any portion thereof. The broadband gateway 302 may then trigger a corresponding alert, which may be communicated to the user 308 via the home device 304. The user 308 may then authorize accessing of the user confidential data, using user input provided via the home device 304, which may be communicated to the broadband gateway 302 via the link 306 for example. In turn, the broadband gateway 302 may transmit an acknowledgement response 314 authorizing access of the confidential data by the recipient that sent the alert message 312. In one exemplary embodiment of the invention, the broadband gateway 302 may be configured, based on user input for example, to autonomously handle and/or respond to alert messages 312, based on predetermined criteria for example. For example, the user 308 may specify that alert messages 312b received from recipient 310b may be handled and/or responded to, by transmitting acknowledgment responses 314b, directly by the broadband gateway 302.

In instances where the confidential data is encrypted, the acknowledge responses 314 may also incorporate and/or carry decryption information that may be utilized to decrypt the confidential data. In this regard, the decryption information may identify, for example, the utilized encryption algorithm, and/or may provide necessary decryption parameters, such as decryption keys for example. The decryption information may be provided by the user 308 as part of the user input provided in response to reception of the alert. The decryption information may also be maintained in the broadband gateway 302, and may only be incorporated into the acknowledge response 314 based on user input. Accordingly, in this manner, the acknowledgement responses 314 may be utilized to bar access to confidential data when received by an unauthorized recipient. For example, in instances where the broadband gateway 302 receives the alert message 314n from the recipient 310n, and the user decides to decline authorization of access to the confidential data by the recipient 310, the access to the confidential data may be barred by omitting transmittal of a corresponding acknowledgement response 314.

In order to further secure communication of confidential data, the broadband gateway 302 may also incorporate mechanisms that may enable rendering the confidential data unusable under certain conditions. In this regard, the broadband gateway 302 may utilized and/or incorporated into the confidential data, and/or into network packets carrying the confidential data, various timing parameters that enable rendering the confidential data and/or the network packets unusable. For example, in instances where the confidential data is only intended for recipient 310b, the broadband gateway 302 may calculate and/or estimate a duration required for communicating the confidential data to the recipient 310a, and may then incorporate timing tags that may enable deleting, decimating, corrupting and/or making the confidential data and/or the network packets carrying the confidential data unusable after passage of that duration, such as before reaching the recipient 310n for example.

Figure 3B:
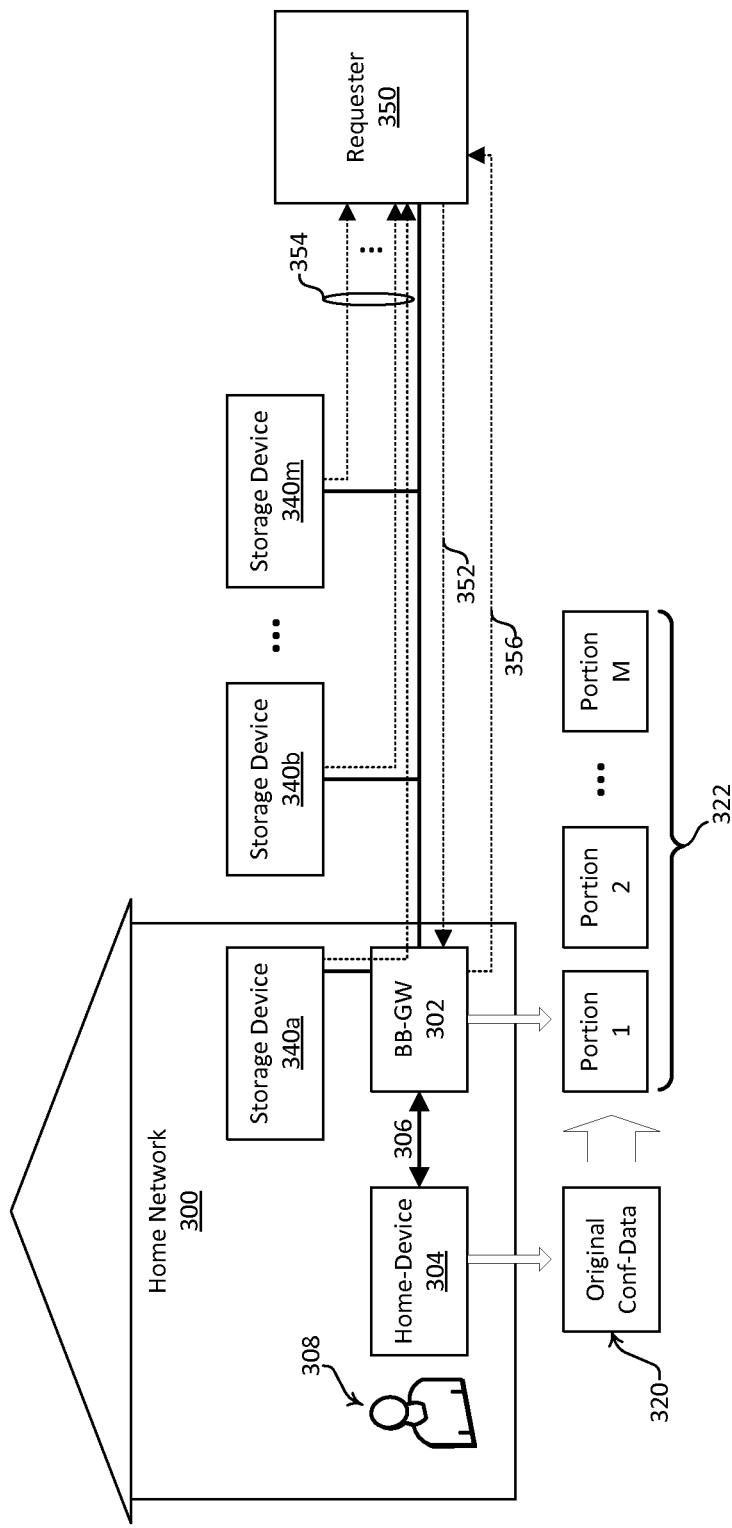
FIG. 3B is a block diagram illustrating an exemplary distributed storage and secure communication of user confidential data via a broadband gateway, in accordance with an embodiment of the invention.

FIG. 3B is a block diagram illustrating an exemplary distributed storage and secure communication of user confidential data via a broadband gateway, in accordance with an embodiment of the invention. Referring to FIG. 3B, there is shown the home network 300 of FIG. 3A. Also shown in FIG. 3B is a plurality of storage devices 340a-340m and a requester 350.

Each of the storage devices 340a-340m may comprise suitable logic, circuitry, interfaces, and/or code that may be operable to provide permanent and/or temporary storage of information, and/or fetching or retrieval thereof. The storage devices 340a-340m may also be operable to communicate and/or interact with the broadband gateway 302 and/or the requester 350, using wired, wireless, and/or optical connections for example. One or more of the storage devices 340a-340m may be located outside the home network 300. In one exemplary embodiment shown in FIG. 3B, the storage device 340a is located within the home network 300, whereas the remaining storage devices 340b-340m are located outside the home network 300.

The requester 350 may comprise an entity that may request user confidential data which may be available via the broadband gateway 302. In this regard, the requester 350 may comprise suitable logic, circuitry, interfaces, and/or code that may be operable to communicate and/or interact with the broadband gateway 302, via the distribution networks 110 for example (not shown). The requester 350 may be correspond to one or more of the recipients 310a-310n, substantially as described with regard to FIG. 3A for example. In this regard, the requester 350 may comprise an entity providing certain services, such as healthcare or financial services, and which may utilize the user confidential data in conjunction with providing services to that particular user. In some instances, however, the requester 350 may correspond to an entity seeking to obtain user confidential data in unauthorized manner.

In operation, the broadband gateway 302 may be operable to provide secure storage of user confidential data. In this regard, the broadband gateway 302 may securely store confidential data associated with users serviced by the broadband gateway 302 in the home network 300, such as the user 308. The broadband gateway 302 may maintain the user confidential data, by storing it directly within the broadband gateway 302. The broadband gateway 302 may also store the user confidential data in a device coupled to the broadband gateway 302, such as one of the storage devices 340a-340m. For example, the broadband gateway 302 may store the confidential data in the storage devices 340a. In one embodiment of the invention, the broadband gateway 302 may utilize distributed storage when storing user confidential data, substantially as describe with regard to FIG. 1. For example, the user 308 may generate some confidential data 320, using the home device 304, for example. The user 308 may then communicate the user confidential data 320 to the broadband gateway 302, using the home device 304 and the link 306. To facilitate distributed storage of the user confidential data 320, the broadband gateway 302 may split the user confidential data 320 into a plurality of portions 322, comprising portions 1, 2, . . . , M, such that each of the plurality of portions 322 may be stored separately in one the plurality of storage devices 340a-340m. For example, portion 1 may be stored in the storage device 340a, portion 2 may be stored in the storage device 340b, . . . , and portion M may be stored in the storage device 340m. In instances the, user confidential data 320 may be encrypted before any partitioning. Accordingly, the plurality of portions 322 may comprise portion of the encrypted user confidential data 320, and therefore, the original user confidential data 320 may be obtained only after aggregating the portions 1, 2, . . . , M; and then applying appropriate decryption.

The broadband gateway 302 may utilize the distributed storage described herein to facilitate and/or support secure communication and/or sharing of the user confidential data 320. Partitioning the user confidential data 320 into the plurality of portions 322, and storing the plurality of portions 322 separately thereafter, may protect against inadvertent or malicious access of the user confidential data 320 because any such access would require obtaining all of the plurality of portions 322. For example, the requester 350 may send a request message 352 requesting the user confidential data 320. The broadband gateway 302 may alert the user 308, via the home device 304 for example. If the user 308 does not authorize accessing the user confidential data, the requester 350 may be preventing for obtaining that data even if the requester 350 managed to obtain some portions, such as portions 2 and M for example. In instances where the user 308 may authorize access to the user confidential data 320, by providing appropriate user input via the home device 304 for example, the broadband gateway 302 may respond to the requester 350. In this regard, the broadband gateway 302 may trigger communication of a plurality of messages 354, comprising copies of the portions 1, 2, . . . , M, from the storage devices 340a-340m, respectively, to the requester 350. Once the requester 350 receives all of the portions 1, 2, . . . , M, the requester 350 may aggregate the portions to obtain the user confidential data 320.

In instances where the user confidential data 320 is encrypted, decryption information which may be required to decrypt the confidential data may also be sent to the requester 350. For example, the broadband gateway 302 may communicate a response message 356 carrying the decryption information, for use decrypting plurality of portions 322. The decryption can be before or after aggregating the portions 1, 2, . . . , M. In this regard, the decryption information may identify, for example, applied encryption algorithm(s), and/or necessary decryption parameters used therewith, such as decryption keys for example.

The broadband gateway 302 may be configured, based on user input provided by the user 308 for example, to autonomously handle and/or respond to request messages 352, based on predetermined criteria for example. For example, the user 308 may specify that if the requester 350 authenticates that it is a legitimate requester, for example the user's healthcare provider or bank, the broadband gateway 302 may handle communication of the plurality of portions 322 and/or the decryption information directly, and/or without user input.

Figures 4A, 4B:
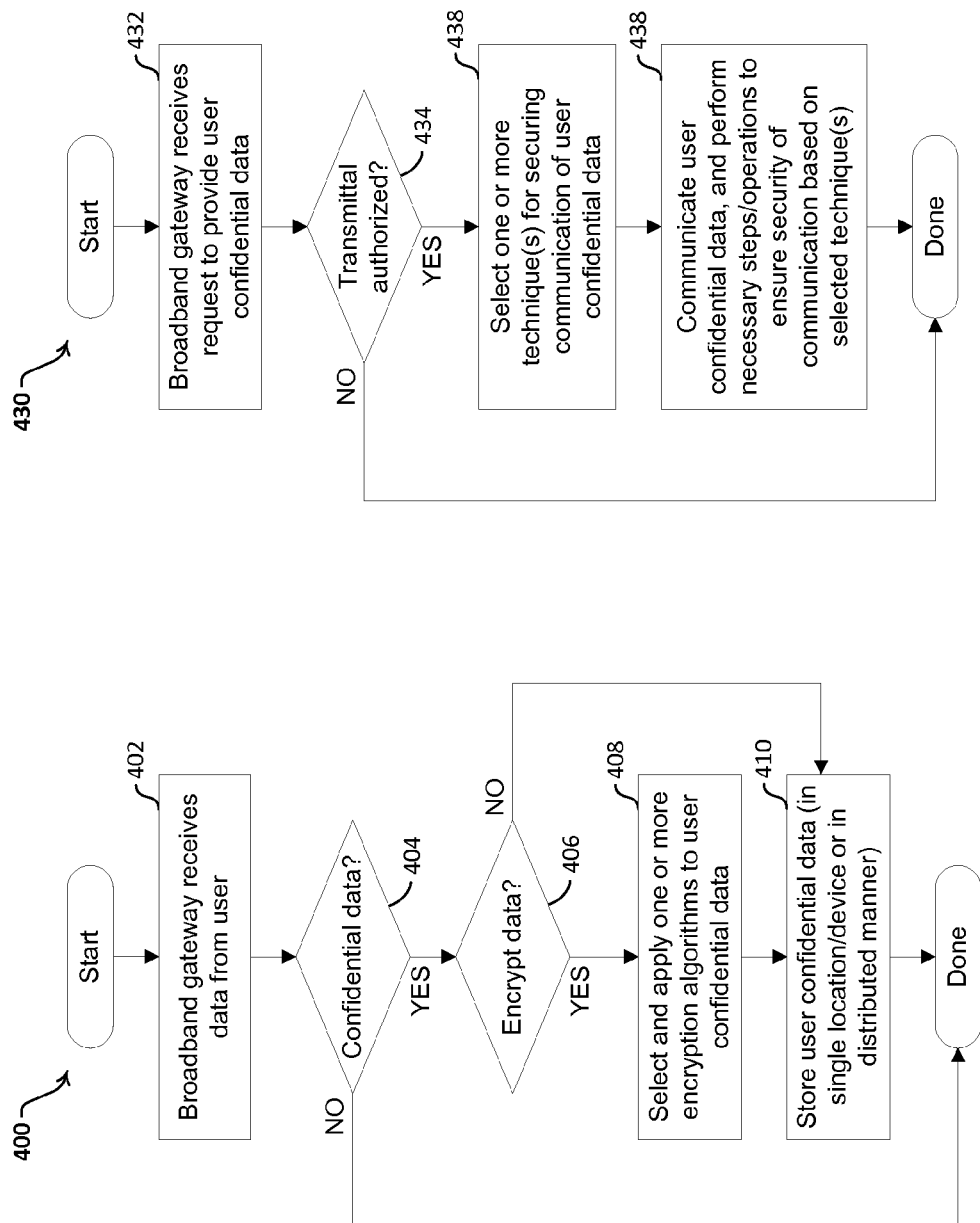
FIG. 4A is a flow chart that illustrates exemplary steps for utilizing a broadband gateway to provide secure storage of user confidential data, in accordance with an embodiment of the invention.
FIG. 4B is a flow chart that illustrates exemplary steps for utilizing a broadband gateway to provide secure communication and/or sharing of user confidential data, in accordance with an embodiment of the invention.

FIG. 4A is a flow chart that illustrates exemplary steps for utilizing a broadband gateway to provide secure storage of user confidential data, in accordance with an embodiment of the invention. Referring to FIG. 4A, there is shown a flow chart 400 comprising a plurality of exemplary steps that may be performed by a broadband gateway, such as the broadband gateway 102, to provide secure storage of confidential data associated with users serviced by the broadband gateway 102 in a home network, such as the home network 100a.

In step 402, a broadband gateway, such as the broadband gateway 302, may receive data from a user, such as the user 308 in the home network 300. In step 404, a determination of whether the received data comprises confidential data may be performed. In instances where the received data does not comprise user confidential data, the plurality of exemplary steps may terminate. Returning to step 404, in instances where the received data comprises user confidential data, the plurality of exemplary steps may proceed to step 406. In step 406, a determination of whether to encrypt the user confidential data may be performed. In instances where no encryption of the user confidential data is required, the plurality of exemplary steps may skip directly to step 410. Returning to step 404, in instances where encryption of the user confidential data is required, the plurality of exemplary steps may proceed to step 408.

In step 408, encryption of the user confidential data may be performed. In this regard, the broadband gateway 302 may select and apply one or more encryption algorithms to the received user confidential data, substantially as described with regard to FIG. 3A, for example. In step 410, the user confidential data may be securely stored. In this regard, the broadband gateway 302 may store the user confidential data in single device or in distributed manner, substantially as described with regard to FIGS. 3A and 3B.

FIG. 4B is a flow chart that illustrates exemplary steps for utilizing a broadband gateway to provide secure communication and/or sharing of user confidential data, in accordance with an embodiment of the invention. Referring to FIG. 4B, there is shown a flow chart 430 comprising a plurality of exemplary steps that may be performed by a broadband gateway, such as the broadband gateway 102, to provide secure communication and/or sharing of confidential data associated with users serviced by the broadband gateway 102 in a home network, such as the home network 100a.

In step 432, a broadband gateway, such as the broadband gateway 302, may receive a request to provide user confidential data maintained in a home network, such as the home network 300. In step 434, a determination whether communication and/or sharing of user confidential data is authorized may be performed. In this regard, the authorization may be based on, in whole or part, user input. In instances where communication or sharing of user confidential data is not authorized, the plurality of exemplary steps may terminate. Returning to step 434, in instances where communication and/or sharing of user confidential data is authorized, the plurality of exemplary steps may proceed to step 436. In step 436, the broadband gateway may select one or more mechanisms for ensuring that communication and/or sharing of user confidential data may be done in a secure manner. For example, the broadband gateway 302 may utilize tagging based tracking, incorporation of termination conditions, and/or utilization of distributed storage based transmissions to ensure secure communication and/or sharing of user confidential data, substantially as described with regard to FIGS. 3A and 3B. In step 438, the broadband gateway 302 may communicate user confidential data, and/or may perform necessary steps/operations to ensure security of communication based on the selected mechanisms. In this regard, the broadband gateway 302 may ensure that alert messages 312 are received and/or that acknowledgement responses 314 are transmitted when utilizing tracking, for example.

Various embodiments of the invention may comprise a method and system for providing secure communication and/or sharing of personal data via broadband gateway. the broadband gateway 302 may be utilized to manage confidential data associated with the user 308 serviced by the broadband gateway 302, in the home network 300, to protect the user confidential data against unauthorized access and/or reception. Management of user confidential data may comprise encrypting the user confidential data, via the confidential data management module 206 for example, using one or more encryption algorithms and/or protocols. The broadband gateway 302 may provide decryption information corresponding to applied encryption algorithms, such as when a request for user confidential data is received by the broadband gateway 302, and authorized by the user 308.

Management of user confidential data may also comprise securing communication of the user confidential data during the management of the user confidential data of the user. In this regard, communication of the user confidential data may be secured by tracking the communicated user confidential data, by incorporating tags into one or more network packets utilized during that communication. The tags may require alerting the user, using alert messages 312 for example, and/or acknowledgment by the user, via acknowledgement responses 314, when one or more of the network packets are received and/or when the user confidential data is accessed during the secure communication.

Secure communication of user confidential data may also comprise incorporating one or more access control parameters into the user confidential data the network packets utilized in carrying the user confidential data, to enable rendering the user confidential data, and/or the network packets unusable when one or more conditions are met based on the incorporated access control parameters. The user confidential data and/or the network packets may be rendered unusable by means of deletion, decimation, corruption, and/or by making them inaccessible. The access control parameters may comprise various timing tags and/or parameters. The broadband gateway 302 may utilize distributing storage of the user confidential data during management of the user confidential data. In this regard, the distributed storage of user confidential data may comprise dividing the user confidential data 320 into the plurality of portions 322, and storing the plurality of portions 322 in the plurality of storage devices 340a-340m. Use of distributed storage may be utilized to facilitate secure communication of the user confidential data, by communicating the plurality of portions from the plurality of storage devices 340a-340m when the user confidential data is requested 352, by the requester 350 for example, only when communication of the plurality of portions 322 is authorized. Accordingly, the requester 350 may obtain the user confidential data 320 by aggregating the communicated plurality of portions 354.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing secure communication and/or sharing of personal data via broadband gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:
1. A method, comprising:
receiving user confidential data to store on a broadband gateway located within a local area network (LAN), the broadband gateway including circuitry configured to provide at least one physical layer connection with at least one corresponding network access service provider remote from the LAN;

distributing, by the broadband gateway, the user confidential data into a plurality of portions among a plurality of different types of storage devices within the LAN;

receiving a request, by the broadband gateway from a requester remote from the LAN, for said user confidential data; and transmitting, by the circuitry in response to an authorization of said request from the requester, said plurality of portions of said user confidential data from said plurality of different types of storage devices to said requester.

2. The method according to claim 1, further comprising encrypting, by the circuitry, said user confidential data.

3. The method according to claim 2, further comprising providing, by the circuitry in response to the authorization of said request from the requester, decryption information associated with said encrypting of said user confidential data.

4. The method according to claim 1, further comprising incorporating, by the circuitry, security tags into one or more network packets including said user confidential data.

5. The method according to claim 4, wherein said security tags alert said broadband gateway when said one or more network packets are received and/or when said user confidential data is accessed.

6. The method according to claim 1, further comprising incorporating, by the circuitry, one or more access control parameters into one or more network packets including said user confidential data, wherein
said one or more access control parameters render said user confidential data unusable when one or more conditions are met based on said one or more access control parameters.

7. The method according to claim 1, further comprising dividing, by the circuitry, said user confidential data into said plurality of portions of said user confidential data.

8. The method according to claim 1, wherein the requester obtains said user confidential data by aggregating said plurality of portions of said user confidential data.

9. A broadband gateway within a local area network (LAN), the broadband gateway comprising:
circuitry configured to
receive user confidential data and store the user confidential data;
provide at least one physical layer connection to at least one network access service provider remote from the LAN;
distribute the user confidential data into a plurality of portions among a plurality of different types of storage devices within the LAN;
receive a request, from a requester remote from the LAN, for said user confidential data; and
transmit, in response to an authorization of said request from the requester, said plurality of portions of said user confidential data from said plurality of different types of storage devices to said requester.

10. The broadband gateway according to claim 9, wherein said circuitry is configured to encrypt said user confidential data.

11. The broadband gateway according to claim 10, wherein said circuitry is configured to transmit said encrypted user confidential data and decryption information associated with said encrypted user confidential data to said requester in response to said authorization of said request.

12. The broadband gateway according to claim 9, wherein said circuitry is configured to incorporate security tags into one or more network packets including said user confidential data.

13. The broadband gateway according to claim 12, wherein said security tags alert said broadband gateway when said one or more network packets are received and/or when said user confidential data is accessed.

14. The broadband gateway according to claim 9, wherein
said circuitry is configured to incorporate one or more access control parameters into one or more network packets including said user confidential data, and
said one or more access control parameters render said user confidential data unusable when one or more conditions are met based on said one or more access control parameters.

15. The broadband gateway according to claim 9, wherein said circuitry is configured to divide said user confidential data into said plurality of portions of said user confidential data.

16. The broadband gateway according to claim 9, wherein the requester obtains said user confidential data by aggregating said plurality of portions of said user confidential data.

17. A broadband gateway within a local area network (LAN), the broadband gateway comprising:
circuitry configured to
receive user confidential data to store on a broadband gateway located within a local area network (LAN), the broadband gateway including circuitry configured to provide at least one physical layer connection with at least one corresponding network access service provider remote from the LAN;
divide the user confidential data into a plurality of portions and distributing the plurality of portions among a plurality of storage devices within the LAN;
receive a request, from a requester remote from the LAN, for the user confidential data; and
trigger, in response to an authorization of the request, communication of the plurality of portions of the user confidential data to the requester, wherein
the requester obtains the user confidential data by aggregating the plurality of portions of the user confidential data.

18. The broadband gateway according to claim 17, wherein the circuitry is configured to incorporate security tags into one or more network packets including the user confidential data, wherein the security tags require alerting the processing device when the user confidential data is accessed.

19. The broadband gateway according to claim 17, wherein
the circuitry is configured to encrypt, before the distribution, the confidential data to generate encrypted user confidential data, and
the circuitry divides the encrypted user confidential data into a plurality of portions of encrypted user confidential data.

20. The broadband gateway according to claim 19, wherein the circuitry distributes the plurality of portions of encrypted user confidential data among the at least one storage device.

* * * * *